(No Model.)
L. GODDU.
SLOTTING MACHINE.
No. 581,458. Patented Apr. 27, 1897.
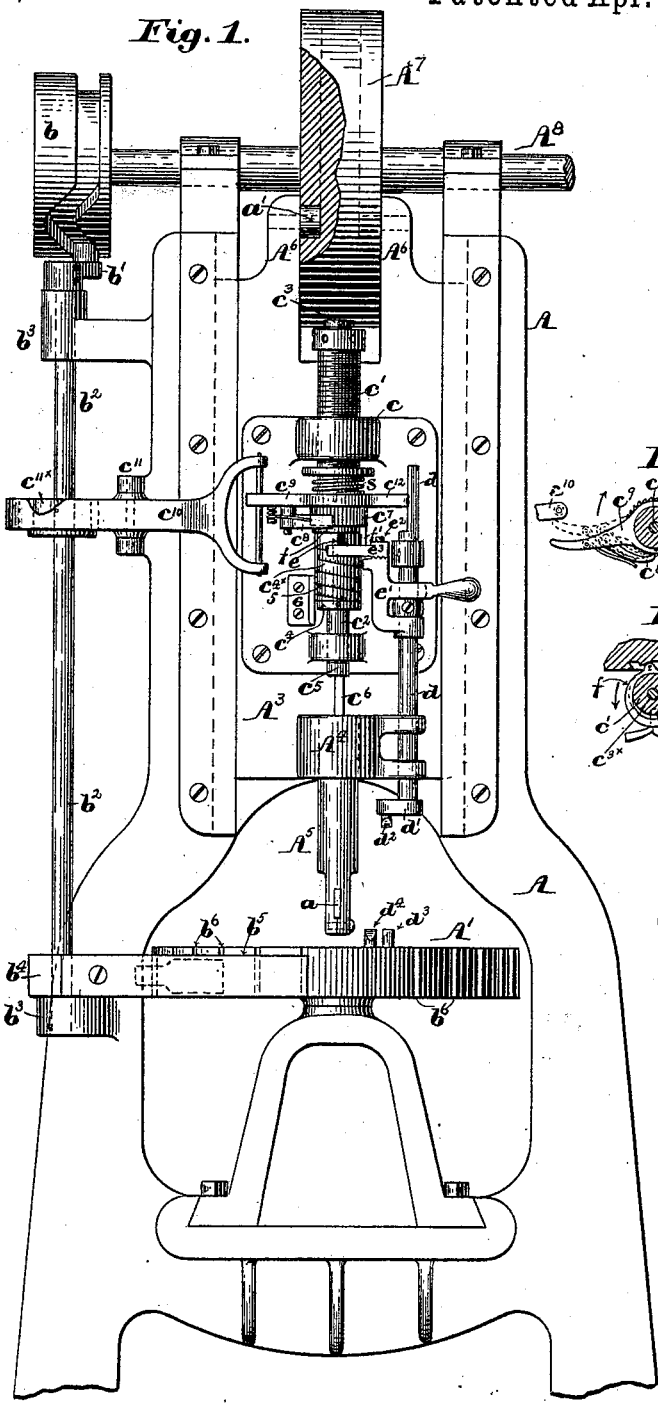
Witnesses:
Walter E. Lombard.
Thomas J. Drummond.
Inventor:
Louis Goddu,
by Crosby & Gregory
Attys.

UNITED STATES PATENT OFFICE.

LOUIS GODDU, OF WINCHESTER, MASSACHUSETTS, ASSIGNOR TO JAMES W. BROOKS, TRUSTEE, OF PETERSHAM, MASSACHUSETTS.

SLOTTING-MACHINE.

SPECIFICATION forming part of Letters Patent No. 581,458, dated April 27, 1897.

Application filed December 18, 1895. Serial No. 572,572. (No model.)

*To all whom it may concern:*

Be it known that I, LOUIS GODDU, of Winchester, county of Middlesex, State of Massachusetts, have invented an Improvement in Slotting-Machines, of which the following description, in connection with the accompanying drawings, is a specification, like letters and figures on the drawings representing like parts.

This invention has for its object the production of a novel machine for broaching or cutting gradually a series of substantially parallel slots in metallic and other articles.

In accordance with my invention the article to be broached or slotted is mounted on a support, which when the surface to be broached is curved has imparted to it a rotary movement.

Suitable devices are provided for feeding the cutting-tool and the article operated upon one relatively to the other, and also for properly feeding the cutter into the article to gradually deepen the cut and the depth of the broach or slot formed by said tool.

Figure 1 is a front elevation of a machine embodying my invention; Fig. 2, a detail of the spindle-feeding mechanism; Fig. 3, a detail of the stopping devices; Fig. 4, a detail showing the lower end of the tool-holder, part of the tool, its adjusting devices, and part of the spindles for moving the latter. Fig. 5 shows a piece of metal the hub of which is broached or slotted, as may be done by the machine to be described; and Fig. 6, a sectional detail to be referred to.

In the embodiment of my invention herein selected for illustration and shown in the drawings the frame A is of suitable shape and construction to sustain the several working parts, it, as herein shown, having suitably mounted in it a work-support $A'$ (shown as a rotatable support) and provided at its center with a suitable opening for the reception of the article shown at $A^\times$, Fig. 5; but instead of the particular support herein shown the same may be made of any suitable or desired form to properly hold the article to be operated upon.

The frame A is provided with suitable guideways for the reciprocating slide $A^3$, provided at its lower end with a boss $A^4$, which carries the tool-holder $A^5$, the tool $a$ in the present instance of my invention being shown as arranged in a transverse slot in the lower end of its holder, and in the present instance movable radially to the axis of the holder for varying the depth of cut, as will be hereinafter explained.

The slide $A^3$ in the present instance of my invention is bifurcated at its upper end, forming two arms $A^6$, provided, respectively, with rollers $a'$, entering opposite similar cam-grooves in the disk $A^7$ on and rotatable with the driving-shaft $A^8$, journaled in suitable bearings in the frame, this toothed sector imparting to the slide a vertical reciprocating motion.

Upon the driving-shaft $A^8$, I have herein mounted a peripheral cam $b$, adapted to act upon and move an arm $b'$, fast on the upper end of a shaft $b^2$, journaled in suitable bearings $b^3$, projecting laterally from the frame and at or near its lower end provided with an arm $b^4$, to which is pivoted a suitable spring-controlled pawl $b^5$, adapted to engage a series of teeth $b^6$ at the periphery of the rotatable work-support $A'$.

The slide $A^3$ in the present instance of my invention is provided with a boss $c$, in which is threaded the tubular feed-sleeve $c'$, and on the lower reduced end $c^2$ of this sleeve is fixed the ratchet-wheel $c^7$, having its hub provided at its lower end with a collar $c^4$, between which and said ratchet and upon said hub is loosely mounted the tube $c^{4\times}$.

A screw $c^3$ is tapped into the upper end of the sleeve $c'$, said screw acting upon the upper end of a rod $c^{3\times}$ within the sleeve $c'$ and having a beveled lower end acting against the beveled end of a clamp-piece $c^{3\times\times}$, which when said rod is pushed downwardly by the screw is moved outwardly against the inner side of the tube $c^{4\times}$ to clamp the latter to and to rotate with the sleeve $c'$. The end $c^2$ of the sleeve $c'$ is extended downwardly below the collar $c^4$ and has rotatably swiveled to it the rectangular feed-adjuster $c^6$.

At its lower end the spindle $c^2$ has suitably clamped to it, as at $c^5$, (see Fig. 4,) the feed-adjuster $c^6$, shown as a square spindle extending down through the tool-holder $A^5$, and has its lower end made beveled or wedge-shaped to act upon the correspondingly-shaped rear end of the tool $a$, so that when the said adjuster $c^6$ is forced downwardly its wedge-shaped end will force the tool outwardly to increase its depth of cut.

For the rotation of the feed-sleeve $c'$, to thereby cause vertical movement of the sleeve for moving the feed-adjuster to vary the position of the tool, I have herein provided said threaded sleeve with a series of ratchet-teeth $c^7$, Figs. 1 and 2, coöperating with which is a spring-controlled feed-pawl $c^8$, pivoted to a pawl-carrier $c^9$, loosely journaled upon and about the sleeve $c'$, immediately above the said ratchet-teeth, and provided with a radially-extended arm adapted to be engaged by the inner end of a lever $c^{10}$, pivoted at $c^{11}$, and at its outer end acted upon by a suitable cam $c^{11\times}$, fast on and rotatable with the shaft $b^2$ referred to.

Referring to Figs. 1 and 2, the pawl-carrier $c^9$ is provided with a second radial arm $c^{12}$, the end of which stands adjacent or in contact with the upper end of a vertical rod $d$, mounted in suitable bearings on and adapted to reciprocate with the slide $A^3$, the said rod at its lower end being provided with a crank-like head $d'$, carrying a depending pin $d^2$, having its inner end, in the present instance, made wedge-shaped or beveled at both sides to coöperate successively at proper times, to be referred to, with the pins $d^3$ $d^4$, rising from the rotatable work-support $A'$. The upper end of the rod $d$ is slabbed, as shown best in Fig. 2. When this rod stands in the position shown in Fig. 2, it acts upon the arm $c^{12}$ of the pawl-carrier and prevents movement of the same by its spring $s$ (shown in Fig. 1) in the direction of the arrow—that is, the rod $d$ prevents movement of the pawl-carrier. A slight rotative movement of the rod $d$ in the direction of arrow 5, Fig. 2, will, however, cause it to clear said arm $c^{12}$ and permit the spring $s$ to return the pawl-carrier into its dotted position in contact with and in readiness to be moved by the lever $c^{10}$ when the latter is rocked by the cam on the shaft $b^2$.

In the present instance, for illustrative purposes, I have shown as the article to be broached or slotted a tube or cylinder $A^\times$, it being desired to cut a series of vertical parallel slots in the interior wall of the same.

The operation of the machine thus far described is as follows, viz: Rotation of the driving-shaft $A^8$ acts, through the cam $A^7$, to reciprocate in a vertical line the tool $a$ within the sleeve or cylinder $A^\times$, said tool at each downward movement making a vertical or longitudinal cut of the width of the tool in the interior of the cylinder or tube. The cam $b$ on the driving-shaft $A^8$ acts, through the shaft $b^2$, its arm $b^4$, and the pawl $b^5$, carried thereby, to rotate the work-support and tube or cylinder carried thereby one step, or a distance represented by the distance between two of the peripheral teeth, for each downward movement of the tool, so that between any two succeeding downward movements or cuts of the tool the article $A^\times$ is rotated a distance corresponding to the desired distance between two adjacent slots in the interior of the tube or cylinder. In this manner successive downward movements or cuts of the tool $a$, during a single rotation of the work-support and the tube or cylinder carried thereby, produce a series of parallel cuts of uniform depth in the interior of the tube or cylinder. After the work-support has made practically one complete rotation, and after the last cut has been made, and before the slide has completed its final downward movement, the pin $d^2$ on the rod $d$ strikes the first or foremost pin $d^3$ on the rotating work-support and is thrown to the right to partially rotate the rod $d$, turning its slabbed upper end into such position as will release the pawl-carrier $c^9$ and permit its spring $s$ to return it into its dotted position, Fig. 2, so that the next vibration of the lever $c^{10}$, by its cam on the rod $b^2$, will move the pawl-carrier $c^9$ into its full-line position, Fig. 2, causing its pawl to engage one of the ratchet-teeth $c^7$ to turn the sleeve $c'$ a distance represented by the movement of the pawl, causing the said sleeve, by reason of its threads, to be moved downwardly a given distance and through the adjuster $c^6$ to force it outward, so that the next series of cuts shall be made deeper than the first series. The sleeve $c'$ having been rotated one step to increase the depth of cut, as described, at the first downward movement or cut of the new series the pin $d^2$ on the rod $d$ strikes the second pin $d^4$ on the rotating work-support and is returned again to its original position, turning the slabbed upper end of the rod $d$ into position in front of the pawl-carrier $c^9$ to prevent return of the latter, so that during further operation of the machine in making the second series of cuts the pawl-carrier is held away from engagement with the constantly-vibrating lever $c^{10}$, said pawl-carrier being permitted to move into position for engagement by said lever and at the ends of each successive series of cuts to feed the tool outwardly for the next succeeding series. This operation is repeated, the tool making successive series of cuts, each series of cuts deeper than the series preceding, until the slots have been cut to the required depth, when the machine is automatically stopped by a device which will now be described.

Immediately below the series of ratchet-teeth $c^7$ I have provided the sleeve $c'$ with a pocket $e$, Fig. 1, and upon the rod $d$ I have loosely mounted a yoke $e'$, which at its upper end is provided with a rigid arm $e^3$, which may or may not be integral with said yoke, a spring $s'$ being interposed between the face of the slide and the handle $e^4$ on said yoke and holding said arm $e^3$ with its said inturned finger normally in contact with the periphery of the sleeve $c'$, Fig. 3. Rotatably mounted above the sleeve $c'$, in the present instance on the hub of and immediately below the series of ratchet-teeth $c^7$ and above the pocket $e$, is a cam-ring $f$, which, as shown, is provided with a depending finger $f'$, which stands immediately back of a laterally-extended ear $e^6$ on the yoke $e'$, said cam-ring having a projection which when the ring is rotated in the direction of the arrow, Fig. 3, moves beneath the pawl $c^8$, which is made wide enough to lap over upon the cam-ring, and lifts the said pawl out of engagement with the ratchet-teeth $c^7$. The operation of this automatic stopping mechanism is as follows, viz: When the grooves have been cut to any required depth, the feed-adjuster $c^6$ is always in its lowermost position and the tool in its outermost position, and preparatory to starting the machine the threaded sleeve $c'$ is rotated by hand to raise it and its connected feed-adjuster $c^6$ to such a height that the subsequent downward movement during operation of the machine will force the tool outwardly a distance to give the required slot. This raising of the sleeve $c'$ preparatory to starting the machine raises the pocket $e$ a greater or less distance above the inturned finger on the arm $e^3$. During the subsequent operation of the machine while cutting the slots this pocket $e$, by gradual rotative and descending movement of the threaded sleeve, works downwardly to the level of the inturned finger, and the last rotative movement of the sleeve in placing the tool in its extreme outermost position for the finishing cut of the several slots causes the pocket to be dropped to the level and in position to receive the inturned finger, thereby permitting the spring $s'$ to throw the said finger into the pocket to prevent further rotation of the sleeve and prevent further outward feeding of the tool, so that subsequent operation of the machine may be had without increasing the depth of the slots cut.

I have herein shown the tube $e^{4x}$ as provided with a spiral graduated line 5, and adjacent the said lower end of the sleeve I have arranged upon the slide a fixed index-plate 6, which, in connection with the graduated spiral line, enables the machine to be readily and with certainty adjusted to produce any desired depth of slots.

To adapt the machine for cutting slots in tubes or cylinders of various diameter, tools $a$ of varying lengths may be employed or feed-adjusters $c^6$ of different thicknesses to throw the cutting end of the tool to a greater or less distance from the vertical line of motion.

In a machine for cutting a series of substantially parallel separate and distinct grooves or slots, whether in a curved surface or not, I am, so far as I am aware, the first to make a series of substantially parallel separated and distinct cuts of a given depth and provide automatic means to change the relative positions of the tool and work and repeat the series, cutting the grooves to a greater given or uniform depth, and repeating this operation until the several grooves have been cut to the desired uniform depth, whatever be the particular mechanism for performing such operations.

My invention, therefore, is not limited to the particular embodiment herein shown to enable the invention to be understood, for it is evident the mechanism may be varied without departing from the spirit and scope of the invention as claimed.

I claim—

1. The combination with a work-support, a cutter, and a cutter-carrier, of operating mechanism for said carrier, means operating alternately with said operating mechanism to impart a step-by-step movement to said work-support, a feed device for said cutter, said feed device remaining inoperative during a plurality of unvaried cutting movements of the cutter, means to automatically operate said feed device periodically, thereby to cut a succession of series of unvaried cuts, each series having a deeper cut than the preceding series, and means to automatically stop the feed, substantially as described.

2. A machine of the class described containing in combination, a movable work-support; a tool; a reciprocating slide therefor; feeding devices on said slide to impart a feeding movement to the said tool; a pawl to impart step-by-step movement to the work-support; a pawl-carrier and its shaft, and means on the said shaft to actuate the tool-feeding devices on the slide, substantially as described.

3. A machine of the class described containing in combination, a movable work-support; a reciprocating slide, a cutting-tool carried thereby; tool-feeding devices on the said slide; and means on said movable work-support coöperating with said tool-feeding devices to cause operation of the latter at or near the end of a complete movement or cycle of movements of the former, substantially as described.

4. In a machine of the class described, a movable work-support, a power-shaft, and connections between said shaft and said work-support to move the latter as said shaft rotates, combined with a cutter and its carrier, adapted to be reciprocated by said shaft, and feed devices for said cutter, adapted to be operated by the said connections, substantially as described.

5. In a machine of the class described, a movable work-support, combined with a reciprocating slide, a cutter carried thereby, feeding mechanism carried by said slide to move said cutter relatively to said slide, and means to automatically operate said feeding mechanism, substantially as described.

6. In a machine of the class described, a movable work-support, combined with a reciprocating slide, a cutter carried thereby, and feeding mechanism for said cutter, said mechanism including a rod movable in unison with said slide, means operated by said work-support to rock said rod, and a pawl and ratchet controlled by the rocking of said rod, substantially as described.

7. In a machine of the class described, a movable work-support, combined with a reciprocating slide, a cutter carried thereby, feeding mechanism carried by said slide to move said cutter relatively to said slide, and automatic feed-stopping devices carried by said slide, substantially as described.

In testimony whereof I have signed my name to this specification in the presence of two subscribing witnesses.

LOUIS GODDU.

Witnesses:
 GEO. W. GREGORY,
 THOMAS J. DRUMMOND.